(12) United States Patent
Svedberg et al.

(10) Patent No.: US 6,400,812 B1
(45) Date of Patent: Jun. 4, 2002

(54) USER REGISTRATION

(75) Inventors: Johan Svedberg, Stockholm; Jan Berglund, Tyresö, both of (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/032,951

(22) Filed: Mar. 2, 1998

(30) Foreign Application Priority Data

Mar. 11, 1997 (SE) ............................................. 9700870

(51) Int. Cl.[7] ............................................. H04M 15/00
(52) U.S. Cl. ............................. 379/114.14; 379/127.01; 379/127.02; 370/352; 709/203
(58) Field of Search ................. 379/111–114, 121–122, 379/126–127, 133–134, 144, 188–198, 114.01, 114.14, 115.01, 121.01, 127.01, 127.02, 127.06, 145; 709/203; 705/64–67, 39, 44; 370/352–356

(56) References Cited

U.S. PATENT DOCUMENTS 5,365,580 A   11/1994  Morisaki
6,141,345 A * 10/2000  Goeddel et al.
6,151,628 A * 11/2000  Xu et al. ..................... 709/225

FOREIGN PATENT DOCUMENTS

| EP | 0 732 835 | 3/1996 |
|----|-----------|--------|
| EP | 0 765 068 | 9/1996 |
| WO | 96/20553 | 12/1995 |
| WO | 97/29584 | 2/1997 |
| WO | 97/01920 | 6/1998 |

OTHER PUBLICATIONS

Swedish Application No. SE 96/02212–4.
Swedish Application No. SE 96/00392–6.
Ford, Warwick, "Computer Communications Security", Principles, Standard Protocols and Techniques, Prentice Hall, pp. 109–120, 1994.

* cited by examiner

*Primary Examiner*—Duc Nguyen
(74) *Attorney, Agent, or Firm*—Burns, Doane, Swecker & Mathis, L.L.P.

(57) ABSTRACT

The purpose of the present invention is to be able to register and authenticate a user and thus to allow for a simple charging method. Achivement of registration and authentication to allow for simple charging is solved by letting the client connect to a predefined registry function supplying the telephone number the client is using and that the registry function keeps a table with telephone numbers, authentication codes and IP-addresses.

3 Claims, 6 Drawing Sheets

USER REGISTRATION

TECHNICAL FIELD OF INVENTION

The present invention relates to telecommunication in general and to voice communication over the Internet in particular.

DESCRIPTION OF RELATED ART

As Internet is being more and more popular we tend to spend more and more time in front of our computers while connected to Internet. The most common way of connecting to Internet is by using a modem and the connection times is far longer than the time usually spent in a traditional voice conversation. For home users the use of the telephone line for connectiong to Internet can lead to a conflict since most subscribers only have one line which shall serve both computer communication and voice communication.

In the Swedish patent application SE-9602212-4 is a method for enabling a subscriber to make and receive voice calls during an on-going Internet session disclosed.

In the Swedish patent application SE-9603932-6 the methods disclosed in SE-9602212-4 is further developed and additional problems solved.

The general idea of the above mentioned applications is that a user, connected to Internet via a modem using his ordinary telephoneline, register with a service using a special application in his computer. The service connects the users telephone number to a special number activating a IN service so that whenever a call is placed towards the user, it is redirected to the special number. When the IN service is activated it activates a gateway which connects, via Internet, to the application in the users computer and alerts the user who can the answer the call.

In a similar manner, the user can place an outgoing call using the gateway to act as a bridge between the IP-based Internet and PSTN. In this situation it seems from the PSTN network point-of-view as if the gateway is making the call and should be charged. A solution to this problem is presented in SE-9603932-6.

None of the above mentioned applications discloses specific methods for registration and authentication of users and how this can be solved in advantageous manner as well as how this can be used to allow for a simplified charging method.

SUMMARY OF THE INVENTION

The present invention discloses a method, a node and a network for solving the problem with user registration, authentication and thus being able to allow a simple charging method.

The purpose of the present invention is thus to be able to register and authenticate a user and thus to allow for a simple charging method.

The problem described above, with how to achive registration and authentication to allow for simple charging is solved by letting the client connect to a predefined registry function supplying the telephone number the client is using and that the registry function keeps a table with telephone numbers, authentication codes and IP-addresses.

In more detail, the problem described above is solved by letting the client send a message to a registry function which includes the telephone number the client uses. The registry checks that a user record, with that telephone number as key, exists and retrieves a NRV (Non Repeating Value) and associates that NRV with the user. This NRV is sent to the client which then responds with a value calculated with a ONF (ONe way Function) taking as arguments the telephonenumber, the password. The ONF is then applied again to the result and the NRV. In the registry an AD (Authentication Data) is associated with the user record.

The AD is identical to the value of the ONF applied to the users telephonenumber and the password. The registry takes the AD in the subscriber record, then compares ONF applied to AD and NRV with the value received from the client. If these values are equal the user is authenticated and registrated for use of the service. By using the telephonenumber in the user record in the registry this telephonenumber can be used when the user wants to place an outgoing call.

When the gateway receives a request from the client to place an outgoing call it confirms with the registry that the user is registrated and authentic. In response the gateway also receives the telephonenumber which it sends along with the signalling in the setup of the outgoing call. This telephonenumber is then used by the different network elements to charge the supplied telephonenumber instead of the telephonenumber of the gateway.

One of the advantages of the present invention is that charging of the outgoing calls performed by the gateway is simplified.

Other advantages will be obviouse to a man skilled in the art in the light of the detailed description given below.

Further scope of applicability of the present invention will become apparent from the detailed description given herein after. However, it should be understood that the preferred embodiments of the invention, are given by way of illustration only, since variouse changes and modifications within the scope of the invention will become apparent to those skilled in the art from this detailed description.

DETAILED DESCRIPTION OF PREFERRED EMBODIMENTS

Figure 1:
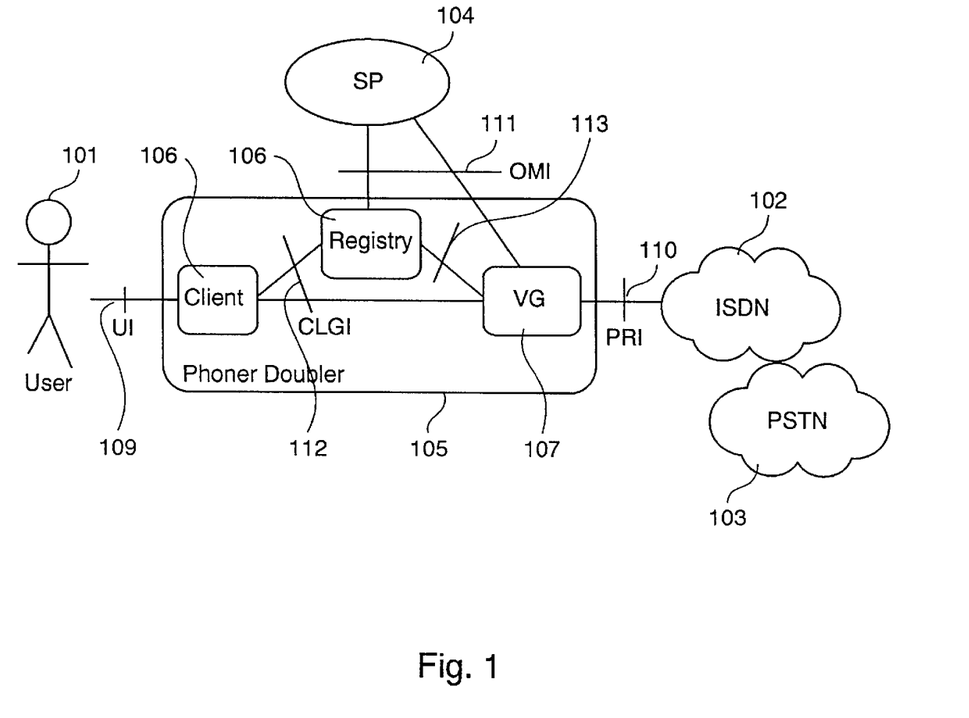
FIG. 1 discloses the interfaces for the phonedoubler.

FIG. 1 depicts the Phone Doubler network and its external interfaces to external networks, users and units. A User 101 is the person using Phone Doubler at home. The user 101 is also the subscriber of the service. A ISDN 102 (Integrated Services Digital Network) is used as gateway to a PSTN 103 (Public Switched Telephone Network). An SP 104 (Service Provider) is the system, organisation and persons responsible for the successful operation of Phone Doubler 105. Also In FIG. 1 is the Phone Doubler inner structure showed. Client 106 is the part of Phone Doubler that is located at the user's premises. A Registry 108 is a node within the gateway that is common for all users of the Phone Doubler service. This node is referred to as the registry in the remainder of this document. A VG 107 (Voice Gateway) is the unit that processes all calls and speech transmission. A VG 107 can handle a number of simultaneous calls. In FIG. 1 are also the interfaces external to the network and nodes identified. A UI 109 (User Interface) is the interface between the User 101 and the Client 106. PRI 110 (ISDN Primary Rate Interface) is the interface used between the VG 107 and the ISDN 102. OMI 111 (Operation and Maintenance Interface) is the interface between SP 104 and the registry 108 and VG 107. A CLGI 112 (Client Gateway Interface) is the interface between the Client 106 and the registry 108 respectively the client and the VG 107. A REGI 113 (Registry Interface) is the interface between the registry 108 and the VG 107.

Figure 2:
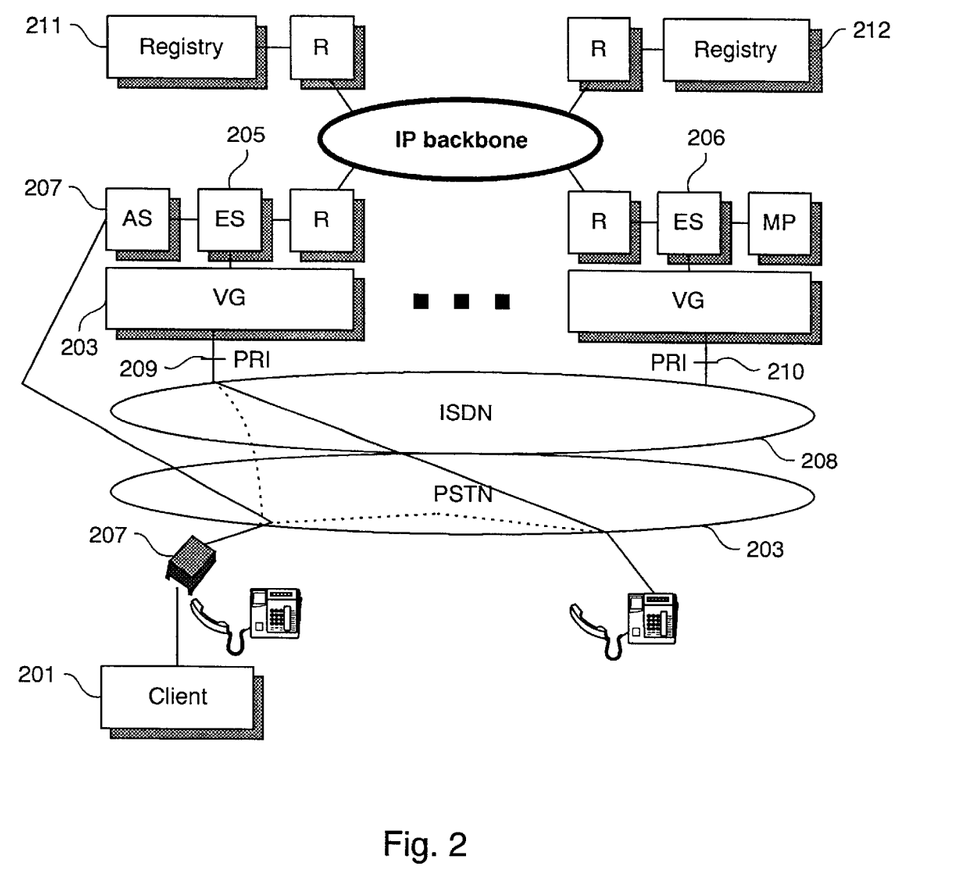
FIG. 2 discloses a more detailed view of the network configuration.

Referring to FIG. 2, the client 201 is running on a PC (not shown), connected to the ISP's (Internet Service Provider) AS 207 (Access Server) at the ISP's. POP (Point Of Presence) via a modem 202 and PSTN 203. The PC is given an IP address by the ISP. This is normally done dynamically when connecting to the POP. In the present preferred embodiment the ISP and the SP 104 is the same organisation or service provider. The VG 203, 204 is connected to the ISP's IP network, typically on the same ES 205, 206 (Switched Ethernet) as the POP. Several VGs 203, 204 can be connected at one POP. Each VG 203, 204 is connected to ISDN 208 via PRI 209, 210. One Registry node 211, 212 can handle several VG:s 203, 204. The Registry node 211, 212 can physically be remotely placed. The VG 203, 204 and Registry 211, 212 are then typically connected to each other via the ISP's backbone IP network 213. The Registry node 211, 212 is normally duplicated for redundancy reasons. Several Routers are denoted with an R in FIG. 2.

Figure 3:
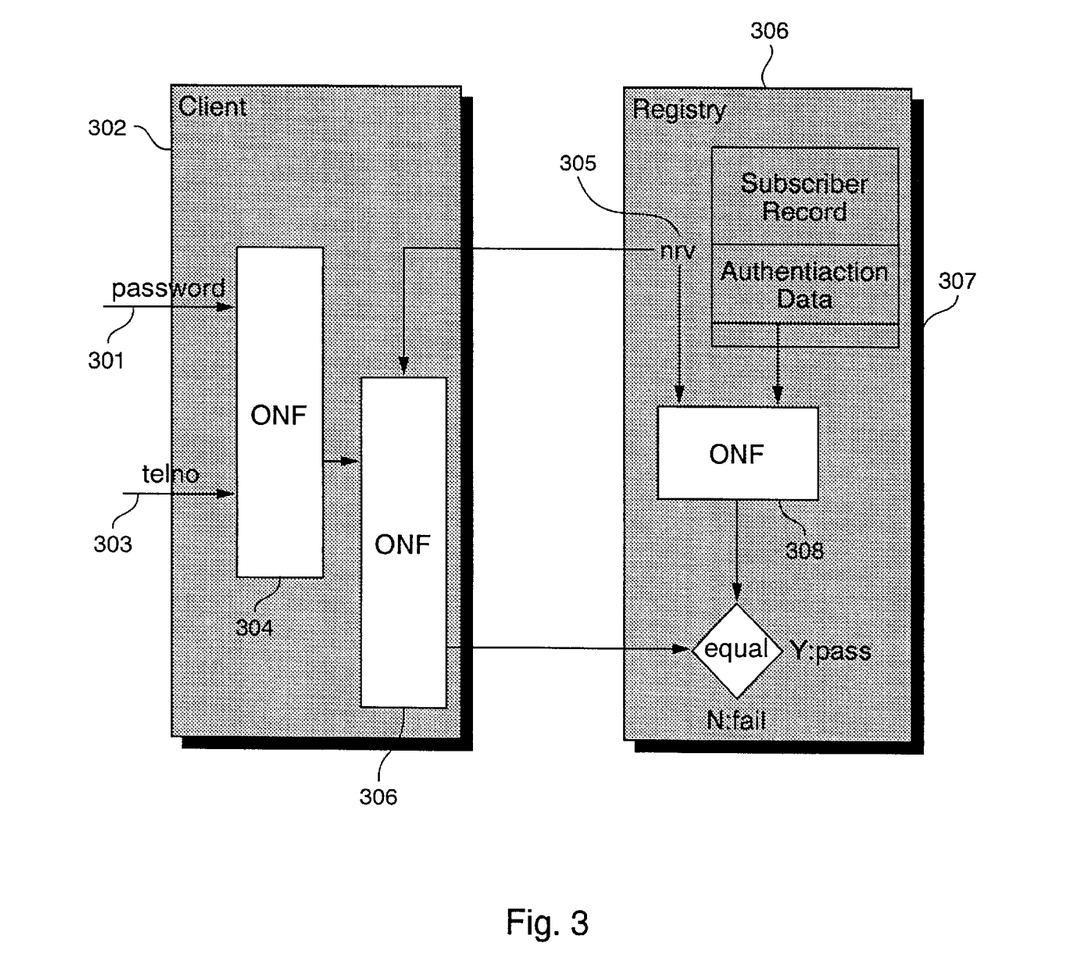
FIG. 3 discloses the method for authentication.

In FIG. 3 a password 301 and the clients 302 telephone number is input to a ONF 304. The client 302 receives a NRV 305 from the registry 306 and applies the NRV 305 and the result from the first ONF 304 to a second ONF 306 and sends the result to the registry 306. The Registry applies the NRV 305 together with a authentication data 307 to a ONF 308, which is the same function as ONF 306. If the result from this calculation is the same as received from the client the client is authenticated.

Figure 4:
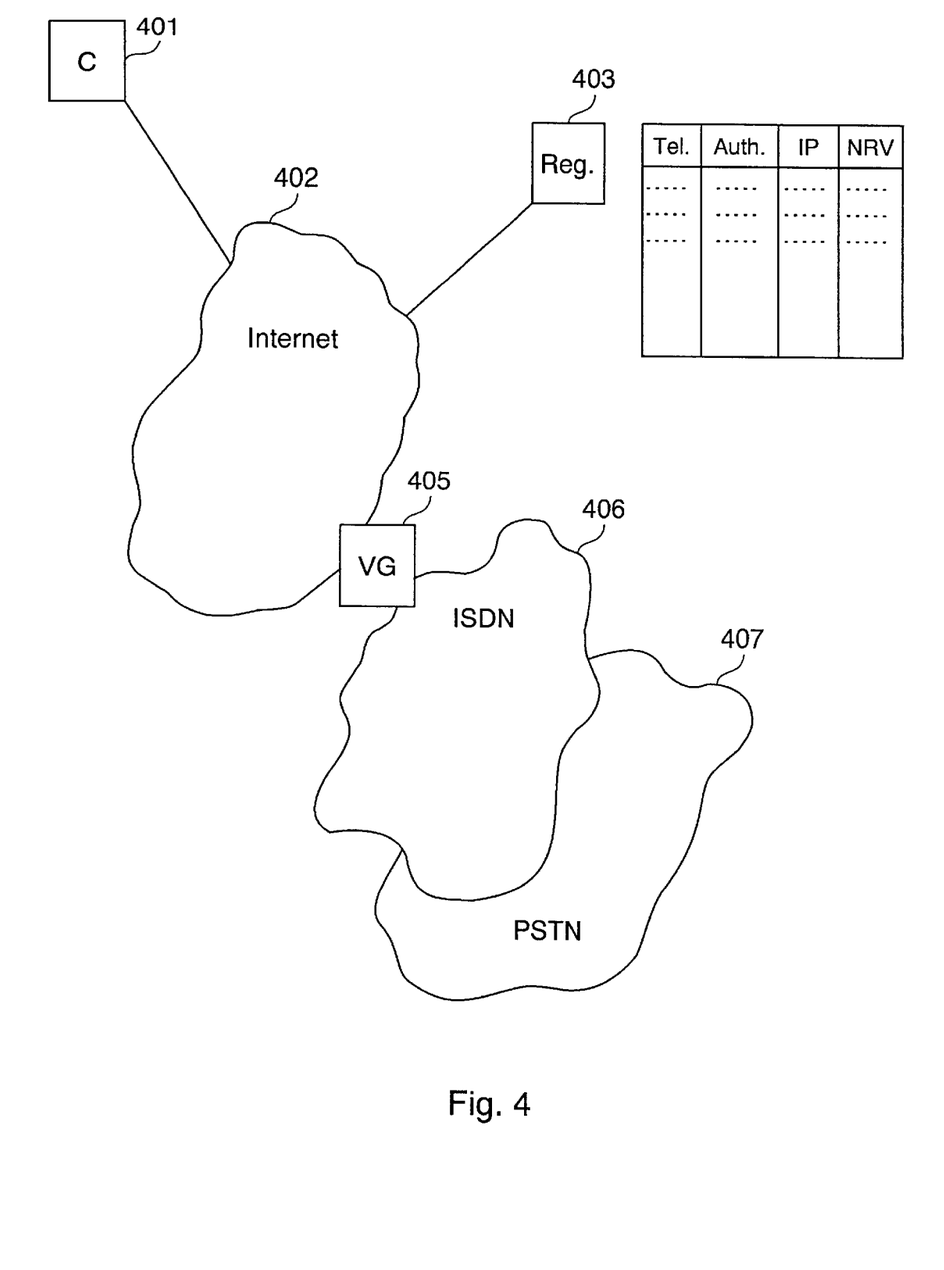
FIG. 4 shows a network configuration for the authentication method.

In FIG. 4 the client 401 is connected to Internet 402 which also a registry 403 is. The registry 403 comprises a table 404 wich in turn comprises at least the fields telephone number, authentication code, IP-adress and NRV. Further more is a VG 405 connected to both the Internet 402 and the ISDN 406 network. The ISDN network is also connected to the PSTN 407 network.

Figure 5:
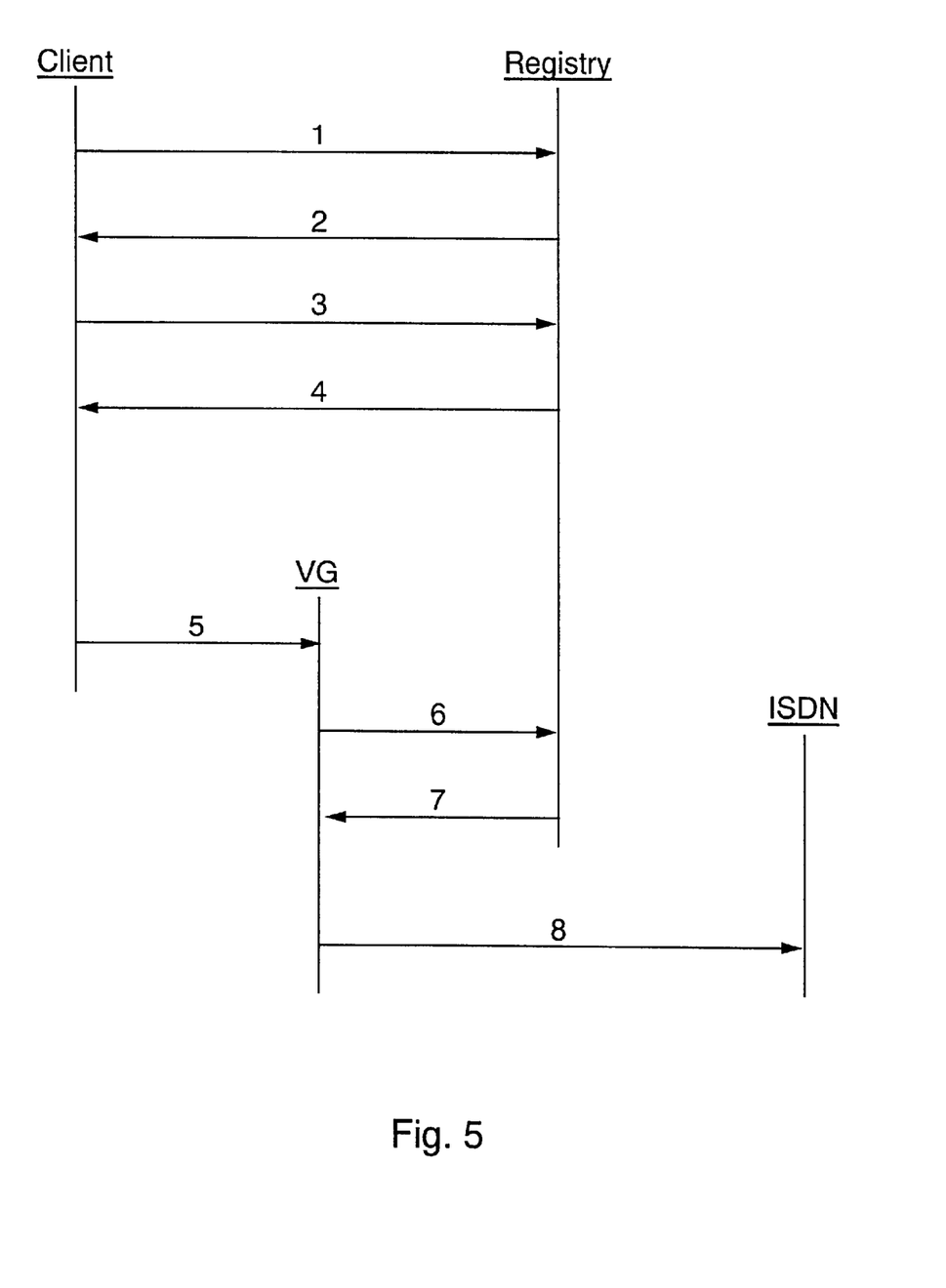
FIG. 5 shows a signalling scheme.

In the signalling scheme in FIG. 5 the following association between numbers in the figure and messages apply:
1. MSG1 comprises telephone number and requests an authentication.
2. MSG2 comprises NRV.
3. MSG3 comprises the value of the function ONF(ONF (telephone number+password)+NRV).
4. MSG4 comprises a boolean value indicating the success of the authentication and the IP-adress of second registry.
5. MSG5 comprises B-number and a request to make an outgoung call from the VG.
6. MSG6 comprises IP-number and a question to the registry wheter or not the IP-adress is authenticated.
7. MSG7 comprises telephone number associated with the IP-number and a confirmation that the client is authenticated.
8. MSG8 comprises User Defined A-number and a request to make a call with the telephon number as User Defined A-number.

When the registry receives MSG1 it generates a NRV and stores it in assocation with the telephone number. When the registry receives MSG3 it apply a ONF to the authentication data associated with the telephone number and the NRV and compares the result with the value received in MSG3. If the values are identical the client is authenticated. When the VG has confirmed that the client wishing to place an outgoing call is authenticated and when the VG has received the telephone number in message OK the VG places a call with the telephone number as user defined telephone number.

Figure 6:
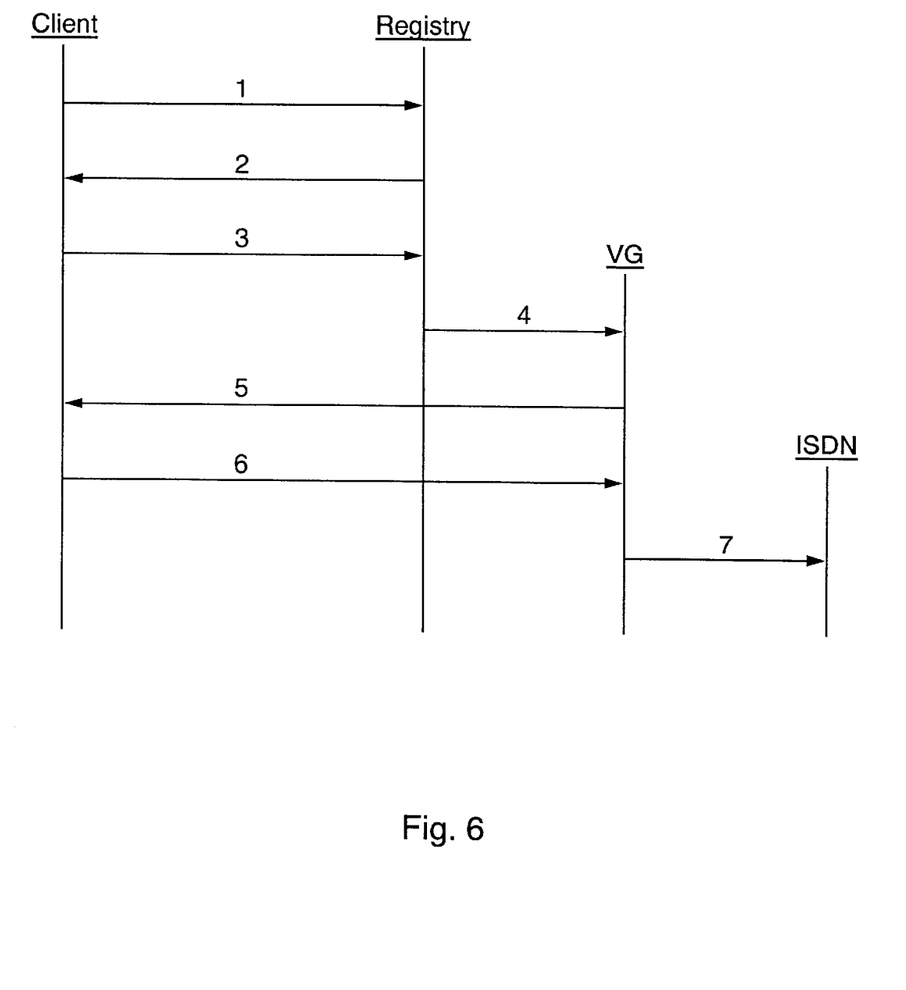
FIG. 6 shows a signalling scheme for another preferred embodiment.

In the signalling scheme in FIG. 6 the following association between numbers in the figure and messages-apply:
1. MSG1 comprises telephone number.
2. MSG2 comprises NRV.
3. MSG3 comprises the value of ONF(ONF(telephone number+password)+NRV).
4. MSG4 comprises the IP-adress of the authenticated client.
5. MSG5 requests the B-number to call.
6. MSG6 comprises B-number.
7. MSG7 places an outgoing call with the telephone number as User Defined A-Number.

In this preferred embodiment the client is authenticated for every try to make an outgoing call.

The central registry nodes may serve several distributed voice gateway modules and form a wide area distributed gateway.

Wide-area Distribution Issues

As long as the gateway contains a single set of VGs collocated with the POP access server, sufficient IP throughput between modems and VGs is simple to ensure (all devices reside in the same LAN environment). A single ISDN group number will also be sufficient to server all VGs.

When the Phone Doubler service is scaled up to form a wide area gateway, each POP has one or several VGs, served by a central registry node. This ensures that voice traffic is guaranteed to have minimum latency and jitter, since the voice traffic through routers is avoided.

Client Data

The client has the following data:
Telephone number, made up from country code, area code[1], and local number. Example: "46-08-6678054"
Authentication data which is in the present preferred embodiment a ONF (ONe way Function) applied to the concatenation of country code, area code, local number and password. (optional, persistent)
Client IP address (volatile)
Host name 1 of registry.
Host name 2 of registry.
Primary VG IP address (volatile)
Secondary VG IP address (volatile)
Reject incoming calls (volatile)

[1]Optional in markets such as Denmark, where area codes are not used.

All of these data can be obtained at the sign-on procedure except for Telephone number and Authentication data.

The combination of country code, area code, and local number identifies each subscriber uniquely.

The VG IP address attribute also represents the state of the client: A null address indicates signed-off, any other address indicates signed-on.

Registry Data

Subscriber Record

Both the registry nodes holds an identical collection of subscriber records with the following attributes:
telephone number (key, persistent, made up from country code, area code, and local number)
authentication data, A ONF applied to telephone number concatenated with password (persistent)
state. Enabled or disabled.
client IP address (secondary key, volatile)
user-id (optional)
primary VG (volatile)
secondary VG (volatile)
number of sign-ons (persistent)
number of incoming calls (persistent)
number of outgoing calls (persistent)
first sign-on (persistent)
last sign-on (persistent)

The client IP address attribute also represents the state of the subscriber record (a null IP address represents signed-off, any other address represents signed-on).

E.164- IP-address association

When a user is connected to the Internet, the IP address of the client is entered into the subscriber record in both registry nodes. Since both the telephone number and this IP address are keys, an E.164- IP-address association between the telephone number are and IP address is maintained in the subscriber record.

Registry Configuration Data

The following data are configurable in the registry:

Data that are to identical in both registry nodes:

User provisioning mode, automatic or manual.

Auto sign-off period (optional, must be greater than the PPP inactivity time-out)

Number of password retries

Auto removal period (optional)

Country code

Trunk prefix (optional)

SMTP-mail server (for e-mail-based alarm handling)

Mail receivers (list of e-mail addresses that will receive alarms)

Time synchronization host. Host name to time synchronisation host

Data that are unique for each registry node

Host name of redundant registry node. (optional)

FTP account in redundant registry node

Emergency numbers

Data that may be equal in both nodes:

Hosts granted access to the WWW-server

Hosts granted access to the FTP-server

VG Record

The gateway configuration is defined by a set of VG records. This set of records is held by the registry, and updated on certain events such as start-up and shut-down of VGs.

IP Address (key)

Name

Primary client networks (only clients in these networks are served by this VG during normal operation)

Secondary up client networks (clients in these networks may be served by this VG when an other VG fails)

Maximum signed-on users

Currently primary signed-on users

Currently secondary signed-on users

VG Configuration Data

The VG holds a set of configuration data that are unique for each VG:

Dial out prefix

IP-addresses of registry. Optionally two, if redundant register.

Monitor interval.

Number extraction method (calling (A), called (B) or redirecting number)

Hosts granted access to the FTP-server

Network charging

Sign-on and Sign-off Functions

Purpose

To make it possible for the user to be connected to the Internet Service Provider's point-of-presence (POP), using his telephone line, and still be able to use that line and number for incoming and outgoing telephone calls.

The following addresses are of importance in these functions:

the user's telephone number the client IP address the ISDN number of the gateway General The sign-on and sign-off functions comes in two flavours, depending on the setting of the authentication mode attribute of the registry configuration.

In the auto provisioning mode the user is allowed to use the service if it's IP-address matches any client networks attribute of the VG-records. In this case the PoP's authentication is trusted and once passed, the user is trusted.

In this mode only charging on IP-addresses may be used and thus network charging. We can't trust the telephone number the user states.

The other, manual, mode means that user must be registered in the system by some administrative procedure into the system, see the subscriber management function. In order to use the service in this mode the users have to go through an authentication procedure also in the Phone Doubler system.

The authentication procedure is based on the challenge response mechanism [Ref. Computer Communications Security, Warwick Ford, Prentice Hall, ISBN 0-13-799453-2]. As ONF the MD5 algorithm can be used [RSA Data Security, Inc. MD5 Message-Digest Algorithm]. ONF(X+Y) denotes below the application of the one way function to the concatenated string X+Y.

Sign-on in Auto Provisioning Mode

This usage-case may only be entered if the state of the client is signed-off. Prior to this usage case the user is assumed to have set up Call Forwarding or (better) Call Forwarding on Busy to the ISDN number of the VG. This can be done with a telephone set or otherwise (software support for this is not provided in the product). In another embodiment the Call Forwarding is handled automatically by the service.

The client checks that the user's Internet session is active. The client saves its current IP address in the client IP address attribute of the client, for reference by other usage cases (outgoing call set-up and sign-off). The client connects to the registry and transfers the telephone number of the user. The registry retrieves the IP address of the client as a parameter of the ongoing TCP session. Note that the client IP address will be different between Phone Doubler sessions if DHCP is in use.

The registry selects a VG and hands over its IP address to the client. The selection of a VG is done by the registry as follows: (1) select those VG records for which the user's IP address match the primary client networks attribute of the VG, (2) select the VG record having the greatest difference between maximum signed-on users and primary signed-on users, (3) check that the maximum signed-on users limit will not be exceeded for the selected VG, and (4) check that the selected VG is not disabled. The selected VG record's currently primary signed-on attribute is incremented.

The registry checks for the existence of a subscriber record with the stated telephone number. A check is made that the client IP address is not associated with any telephone number in the registry at this point. A check is made that the state of the subscriber record is enabled and signed-off.

The subscriber record is updated (the client IP address, number of sign-ons, and last sign-on attributes are updated). The PSTN-IP association is thereby established, and the previous checks ensure that it is unambiguous in both directions. The currently signed-on users attribute of the VG record is incremented. The VG IP address is set in the client.

The client disconnects from the registry.

If the Internet session is not active the user is advised to start an Internet session and try to sign on again. If the registry is not accessible, the user is informed of this and asked to retry later. The-incoming and outgoing call functions will not be available until the client has been successfully signed on. The usage case is terminated.

If the client IP address is not acceptable according to any of the client networks parameters in the VG-records the usage case is terminated. No information is presented to the user, as this exception may be a case of illegal use.

If, due to lack of resources, no VG is available to select, the user is informed of this. The client disconnects from the registry and the usage case is terminated.

If no subscriber record exists for the telephone number provided by the client, a new subscriber record is created. The following attributes are filled in: telephone number, client IP address, first sign-on. Obvious default values are filled in for the remaining attributes. After this the present usage case may proceed. In another embodiment is no new subscriber record created but rather the usage case terminated.

If, prior to this usage case, the client IP address is associated to some user's telephone number in the registry, this association is obviously invalid. The forced sign-off usage case is executed repeatedly for every such telephone number, until no association from the client IP address to some user's telephone number remains. After this the present usage case may proceed.

If the subscriber record indicates that the user is already signed on (from any client IP address), the forced sign-off usage case is executed. After this the present usage case may proceed.

If the subscriber's state is disabled the user is rejected access and the usage case is terminated.

Sign-on Manual Mode

The difference in this case is that the user has to be defined by the service provider prior to sign-on. In the below the addition to the auto mode case is described.

The client first request to start the sign-on procedure by signalling this to the registry. In this message the telephone number is transferred.

The registry checks that a subscriber record, with that telephone number as key, exists and retrieves a non repeating value (NRV) and associates that NRV with the subscriber. This NRV is sent to the client which then responds with ONF (ONF (telno+password)+NRV).

NRV can be for instance current time is milliseconds.

ONF(telno+password) is either fetched from the client configuration or calculated as result of a password prompt dialogue with the user. Which mechanism to use is user defined.

The registry takes the authentication data (AD) in the subscriber record, then compares ONF(AD+NRV) with the value received from the client. If these values are equal the user is authenticated and a counter of authentication failures to zero.

If the user is non existing the user is informed that he has to contact the service provider to be registered.

On authentication failure a counter authentication failures is incremented. If this counter exceeds number of password retries the user is disabled.

If the user already is signed on he is informed of this.

In all other parts the exceptions from the auto case remains.

Sign-off, Auto Mode

The client checks that its state is signed-on.

A reminder to cancel his Call Forwarding setting is presented to the user. Unfortunately, cancellation of Call Forwarding cannot be done until the Internet session is finished (outside the scope of the Phone Doubler product).

The forced sign-off usage case is executed.

The client disconnects from the registry.

If the client state is not signed-on, the usage case is terminated with no further action (shutdown of the client may proceed).

If the registry is not accessible, the usage case is terminated. Shutdown of the client may proceed. This will lead to an invalid association between the user's telephone number and the client IP address, lasting until it is cleared by a sign-on, auto-sign-off or incoming call set-up usage case.

Sign-Off, Manual Mode

The client checks that its state is signed-on.

A reminder to cancel his Call Forwarding setting is presented to the user. Unfortunately, cancellation of Call Forwarding cannot be done until the Internet session is finished (outside the scope of the Phone Doubler product).

The forced sign-off usage case is executed.

The client disconnects from the registry.

If the client state is not signed-on, the usage case is terminated with no further action (shutdown of the client may proceed).

If the registry is not accessible, the usage case is terminated. Shutdown of the client may proceed. This will lead to an invalid association between the user's telephone number and the client IP address, lasting until it is cleared by a sign-on, auto-sign-off or incoming call set-up usage case.

Forced Sign-off

Other usage cases relying on this one are: Sign-on, Sign-off, Incoming call set-up, Auto-sign-off.

The association between the user's telephone number and the client IP address is broken (The subscriber record is updated).

In the VG records, corresponding to the subscriber record's primary and secondary VG, the current primary and secondary signed-on users is decremented.

The registry log is updated.

Auto-sign-off

This usage case is executed periodically in the registry, without manual intervention. The purpose is to remove incorrect information from the subscriber records. The periodicity is given by the auto sign-off period attribute of the registry. It should be reasonably short, since this is how an accidentally disconnected user gets salvaged and can sign on again. It must however be longer than the PPP inactivity time-out, in order not to interfere with that function of the ISP's Internet service.

Examine each subscriber record and carry out the steps below:

If the state of the subscriber record is signed-on, verify that the client is actually alive by connecting to it. If the client is not alive, execute the forced sign-off usage case for this subscriber.

If the client is alive but its telephone number does not match the telephone number attribute in the subscriber record, issue a number inconsistency at auto-sign-off alarm and execute the forced sign-off usage case for the subscriber indicated by the subscriber record.

If the client has not been signed on for a very long time (according to the auto removal period defined in the registry), the subscriber record is deleted.

Relation Between Client UI and Usage Cases

The UI of the client is closely related to the sign-on and sign-off usage cases.

When the client is started it will establish a connection to the ISP's IP network, if not done already by some other application. The sign-on usage case will then be executed automatically.

The client UI also provides a menu choice or push-button by which the user may request a sign-on. This is meaningful e. g. if the initial sign-on failed for some reason.

When the client is terminated the sign-off usage case is executed automatically.

Incoming Call Function

The incoming call function makes it possible for the user to be connected to the point-of-presence (POP), using his telephone line, and still be able to receive telephone calls on that line and number.

The A-party is the party calling the user's telephone number, which is diverted to the ISDN group number of a VG cluster. In another embodiment the telephone number of the user may be diverted to a IN service.

Addresses

The following addresses are of importance in this function:

the user's telephone number the client IP address the A-part's telephone number the voice gateway's ISDN-number Usage Cases Incoming Call Set-up A-part dials B-part's telephone number, which is forwarded to the UAN (Universal Access Number).

The call is originated from the PRI interface. During call set-up the B-part's telephone number is extracted from the Q.931 signalling over PRI. The type of number to extract is configured in the number extraction method.

If the trunk prefix parameter is present its value is prepended to the B-number.

Then the country code parameter is prepended to the B-number.

The VG connects to the registry and looks up the subscriber record of the B-part's telephone number. The client IP address is retrieved from this record.

The VG disconnects from the registry.

A connection is established to the client, using the IP address that was fetched from the registry.

The client indicates an incoming call to the user via the UI. The A-party's telephone number is not presented.

Any of the following usage cases are then possible:

Incoming call answer

Incoming call reject

Incoming call A-part hangs up during ringing

Incoming call ISDN time-out during ringing

If the VG is disabled the B-part is signalled to be busy in PRI and the usage case is terminated.

If the B-parts telephone number is not provided in PRI the call cannot be handled. The B-part is then signalled to be congestion in PRI and the usage case is terminated.

If VG fails to connect to the registry and the registry is redundant this usage case continues with the using the other registry.

If the VG fails to connect to the registry the B-part is signalled to be busy in PRI and the usage case is terminated.

If there is no subscriber record for the provided B-number, the call cannot be handled. The VG disconnects from the registry, the B-part is signalled to be busy in the PRI and the usage case is terminated.

If the B-part's telephone number is not associated with an IP address, the VG disconnects from the registry and the B-part is signalled to be busy in the PRI. The usage case is then terminated. This exception will occur for a user who has signed off and forgotten to cancel his call forwarding.

If the establishment of a connection to the client on the indicated IP address fails, the B-part is signalled to be busy in PRI. The present usage case is then terminated.

If the connection to the client succeeds, but the telephone number of the client is not equal to the B-part's telephone number, the B-part is signalled to be busy in PRI. The present usage case is then terminated.

If the reject incoming calls flag is set in the client the B-part is signalled to be busy in PRI and the usage case is terminated.

If the client software is busy the B-part is signalled to be busy in PRI and the usage case is terminated.

If the client cannot allocate any audio device a message is presented to the user. This message informs him that there is an incoming call, and that he has two options: (1) terminate the application that uses audio and pick up the call, or (2) reject the call. If (2) is selected, the B-part is signalled to be busy in PRI and the usage case is terminated. If (1) is selected, another attempt is made to set up the call. Should this attempt also fail because the audio device is not free, the same message and options are presented repeatedly.

Incoming Call Answer

This usage case can only occur after the incoming call set-up has succeeded. The user chooses to answer the call. The client updates its status message. Speech transmission starts.

Incoming Call Reject

This usage case can only occur after the incoming call set-up has succeeded.

The B-part is signalled to be busy in the PRI.

All resources that were allocated for the call are released in the client and the VG. The VG disconnects from the client.

Incoming Call A-part Hangs Up During Ringing

This usage case can only occur after the incoming call set-up has succeeded.

This usage case is triggered from the PRI.

All resources that were allocated for the call are released in the client and the VG. The user is informed that the A-part has hung up.

The VG disconnects from the client.

Incoming Call ISDN Time-out During Ringing

This usage case can only occur after the incoming call set-up has succeeded.

This usage case is triggered from the PRI. It occurs after a while if the B-part (i. e., the Phone Doubler user) does not act at all, and the A-part does not hang up.

All resources that were allocated for the call are released in the client and the VG. The user is informed that the call was disconnected.

The VG disconnects from the client.

Incoming call B-part Hangs Up During Talking

This usage case can only occur after the incoming call answer has succeeded, i. e. when speech transmission has been established.

All resources that were allocated for the call are released in the client and the VG, and on-hook is signalled in the PRI. The VG disconnects from the client.

Incoming call A-part Hangs Up During Talking

This usage case can only occur after the incoming call answer has succeeded, i. e. when speech transmission has been established.

This usage case is triggered from the PRI. All resources that were allocated for the call are released in the client and the VG.

The user is informed that the A-part has hung up (the VG does not wait for user confirmation of this message).

The VG disconnects from the client.

Outgoing Call Function

To allow a user to make outgoing telephone calls to PSTN/ISDN while being connected over his telephone line to the ISP's point-of-presence (POP).

The following addresses are of importance in this function:

the B-part's telephone number the A-part's IP address

To understand how these addresses are managed please refer to the configuration management function.

Usage Cases

The client performs a very limited number analysis of the B-number.

Outgoing Call set-up

It is required that the state of the client is signed-on.

A-part dials B-part's telephone number. No number analysis is performed in the client.

The client checks that its current IP address, as reported by the operating system, equals the previously saved client IP address attribute of the client.

The client checks for the existence of a free audio device on the client platform and reserves it.

A connection is established to the VG that was assigned to the client at sign-on.

A check is made that the IP address of the client may actually be served by the VG.

The dialled number is transferred to the VG. A very limited number analysis is performed as follows: If the trunk prefix parameter of the VG is non-empty. A check is made that the leading digits of the dialled number do match the trunk prefix.

If the dial-out parameter is present its value is prepended to the dialled number.

An ISDN call is set up to the called number.

If the network charging parameter is true the user's telephone number is signalled as user provided A-number in the PRI.

If the current client IP address differs from the previously saved client IP address attribute, the state of the client is set to signed-off. The user is advised to sign on again, and the usage case is terminated. This situation may arise if a user signs on, the PPP connection goes down, and a new PPP connection with a different client IP address is established.

If the client cannot allocate any audio device the user is informed of the reason and asked to close any application using the audio devices and then retry.

If the connection to the VG cannot be; established, or if the state of the VG is disabled, the client tries to connect to the secondary VG. If this fails the user is advised to close the client and restart it (on the hypothesis that the user will thus be assigned another and better suited VG). The audio device is released and the usage case is terminated.

If the client IP address is not accepted by the VG a rejected IP address at outgoing call alarm is issued. The audio device is released and the usage case is terminated.

If the VG has no free capacity the user is informed of this and advised to retry later. A VG capacity exceeded alarm is issued. The audio device is released and the usage case is terminated.

If the trunk prefix parameter of the VG is non-empty and the leading digits of the dialled number do match the trunk prefix a check is made if the dialled number is an emergency number. If it is an emergency number the usage case continues other wise the user is informed of that the number has an illegal format and the usage case is terminated.

If the called number cannot be reached the user is informed of the reason (busy, congestion, etc.). The audio device is released and the usage case is terminated.

Outgoing Call Answer

This usage case can only occur after the outgoing call set-up usage case has succeeded.

The B-part chooses to answer the call.

The client updates its status message.

Speech transmission starts.

Outgoing Call Reject

This usage case can only occur after the outgoing call set-up usage case has succeeded.

The B-part chooses to reject the call (as may occur if the B-part uses a GSM telephone). The VG sees a busy signal in the PRI.

All resources that were allocated for the call are released in the client and the VG. The user is informed that the B-part rejected the call (the VG does not wait for user confirmation of this message).

The VG disconnects from the client.

Outgoing Call A-part Hangs Up During Ringing

This usage case can only occur after the outgoing call set-up usage case has succeeded.

The user hangs up before the B-part has acted.

All resources that were allocated for the call are released in the client and the VG. The status message in the client is reset to the idle message.

The VG disconnects from the client.

Outgoing Call ISDN Time-out During Ringing

This usage case can only occur after the outgoing call set-up usage case has succeeded.

This usage case is triggered from the PRI. It occurs after a while if the B-part does not act at all, and the A-part does not hang up.

All resources that were allocated for the call are released in the client and the VG. The user is informed that the call was disconnected by ISDN.

The VG disconnects from the client.

Outgoing Call A-part Hangs Up During Talking

This is how successful outgoing calls are usually terminated.

This usage case can only occur after the outgoing call answer has succeeded, i. e. when speech transmission has been established.

All resources that were allocated for the call are released in the client and the VG. The status message in the client is reset to the idle message.

The VG disconnects from the client.

Outgoing Call ISDN Disconnect During Talking

This usage case occurs only infrequently.

This usage case can only occur after the outgoing call answer has succeeded, i. e. when speech transmission has been established.

The B-part hangs up. After a while the ISDN network disconnects the call (the VG sees this in the PRI).

All resources that were allocated for the call are released in the client and the VG. The user is informed that the call was disconnected by the B-part (the VG does not wait for user confirmation of this message).

The VG disconnects from the client.

Subscriber Management Function

To make it possible to administrate the subscribers of the service. The need for service is expected to be small, consisting of occasionally deleting a subscriber record for which the password has been lost.

Usage Cases

Automatic Subscriber Removal

The subscriber record of a user that does not sign on for a very long time gets deleted from the registry. See the auto-sign-off usage case under Fault Management. This will limit the subscriber table in the registry to consist of reasonably active Phone Doubler users. A user that gets removed from the registry can sign on again at any time.

Subscriber Provision

A management system can add a specified users via the OMI FTP-interface.

A human administrator can remove a specified user via the OMI HTTP-interface.

Changes made in one registry node are replicated to the redundant registry node.

Subscriber Removal

A management system can remove a specified users via the OMI FTP-interface.

A human administrator can remove a specified user via the OMI HTTP-interface.

Changes made in one registry node are replicated to the redundant registry node.

Add and Remove Subscriber to/from Blacklist

The subscription's state is set to disabled/enabled.

Can be done via HTTP and FTP

Change password of subscriber

Can be done via HTTP and FTP.

Subscriber Analysis

A human administrator can retrieve the subscriber-records via the OMI HTTP-interface.

Authentication Function

The authentication scheme is described-in the sign-on and sign-off function.

To prohibit illegitimate use of the service. In particular, to reduce the risk that someone states the telephone number of another Phone Doubler user at sign-on.

Charging Function

Charging is supported in a number of ways:

Registry logs is generated and can be retrieved for the purpose of charging periodical fees or statistical purposes.

Call logs are generated and can be retrieved for the purpose of charging per call charges or statistical purposes.

In manual provisioning mode users can be authenticated to be the legitimate user of its telephone number or user-id.

Users can charged based on their IP-address if the charging system can determine the user of a certain IP-address at a certain time. This must be based on logs from the access servers if DHCP is used.

Incoming calls can be charged based on service rates on the UAN.

In manual provisioning mode outgoing calls can be made with user provided A-number which can be used in the telephone networks charging system for charging of outgoing calls.

Performance Management Function

To make it possible for the SP to monitor and adjust the resource utilisation of this service in the network.

Traffic in and out of the gateway is measured on the ISDN side, for which well known and understood tools and methods exist.

The registry log can be used for statistical analysis of sign-on and sign-off behaviour.

The call logs can be used as complement to the ISDN tools to analyse the telephony behaviour.

An alarm is sent if capacity was exceeded at outgoing call.

The invention being thus described, it will be obviouse that the same may be varied in many ways. Such variations are not to be regarded as a departure from the spirit and scope of the invention, and all such modifications as would be obvoiuse to a man skilled in the art are intended to be included within the scope of the following claims.

What is claimed is:

1. A method for authentication of a user in a telecommunication network, said user running a client software on a computer, said computer being connected to Internet using an ordinary telephone line and a modem, said client utilizing a service located in at least one first node connected to Internet and at least one second node connected to both Internet and to said telecommunication network, comprising authenticating said user based on a first telephone number corresponding to said telephone line of said user;

wherein said client sends a message to said service, said message comprising said first telephone number of said telephone line in use of said computer;

said service retrieves a record associated with said first telephone number; said service generates a non-repeating value (NRV) and stores said NRV in association with said first telephone number;

said NRV is sent to the client; said client retrieves a password from the user;

said client calculates a first value based on the first telephone number and the password using a first function;

said client calculates a second value based on the first value and the NRV using a second function and said second value is sent to said service;

said service has previously stored a third calculated value in association with said first telephone number, based on said first telephone number and said password using said first function;

said service calculates a fourth value based on said third stored value and said stored NRV; and said client is authenticated in dependence of if said second value equals said fourth value.

2. The method of claim 1, further comprising the steps of:

connecting said client to said at least one second node connected both to Internet and to said telecommunication network;

requesting a voice call to a second telephone number;

retrieving by said at least one second node said authenticated telephone number; and making said requested voice call using said first telephone number as said user provided A-number.

3. The method of claim 1, further comprising the steps of:

making, by said at least one second node, an outgoing call on request of said user;

sending said telephone number to said at least one second node from said first node upon request from said second node; and using said telephone number in charging said user for said outgoing call made by said at least one second node.

* * * * *